United States Patent
Catalahana et al.

(10) Patent No.: US 9,201,665 B2
(45) Date of Patent: Dec. 1, 2015

(54) OUTPUTTING PRESENTATION CODE UPDATED FOR A PARTICULAR USER IN RESPONSE TO RECEIVING A PAGE IDENTIFIER

(75) Inventors: Carlos Silva Catalahana, Charlotte, NC (US); Jyotibasu Chandrabasu, Hutchinson, MN (US); Ying Huang, Andover, MA (US); Christopher Alan Moore, San Jose, CA (US); Sarabhaiah Polakam, Chester Springs, PA (US); Virmani Singh, Thousand Oaks, CA (US); Peter Anthony Tavormina, Hainesport, NJ (US)

(73) Assignee: Bank of America Corporation, Charlotte, NC (US)

( * ) Notice: Subject to any disclaimer, the term of this patent is extended or adjusted under 35 U.S.C. 154(b) by 377 days.

(21) Appl. No.: 12/771,802

(22) Filed: Apr. 30, 2010

(65) Prior Publication Data
US 2011/0047453 A1 Feb. 24, 2011

Related U.S. Application Data

(60) Provisional application No. 61/236,135, filed on Aug. 23, 2009.

(51) Int. Cl.
*G06F 17/00* (2006.01)
*G06F 9/44* (2006.01)
(52) U.S. Cl.
CPC .................................. *G06F 9/4443* (2013.01)
(58) Field of Classification Search
CPC .................................................. G06F 9/4443
See application file for complete search history.

(56) References Cited

U.S. PATENT DOCUMENTS

| | | | |
|---|---|---|---|
| 6,751,657 | B1 | 6/2004 | Zothner |
| 7,085,927 | B1 | 8/2006 | Kohli |
| 7,231,496 | B2 | 6/2007 | Curtis |
| 8,140,362 | B2 | 3/2012 | Deshpande et al. |
| 8,261,282 | B1 | 9/2012 | Ponnapur et al. |
| 2002/0042835 | A1 | 4/2002 | Pepin et al. |
| 2005/0091373 | A1 | 4/2005 | Ciapala et al. |
| 2006/0168536 | A1 | 7/2006 | Portmann |
| 2006/0212376 | A1 | 9/2006 | Snyder et al. |

(Continued)

FOREIGN PATENT DOCUMENTS

| | | |
|---|---|---|
| CN | 101187878 A | 5/2008 |
| CN | 101258495 A | 9/2008 |
| WO | 0191010 A1 | 11/2001 |

OTHER PUBLICATIONS

Brown, Donald et al.; "Struts 2 in Action"; May 1, 2008; Manning; pp. 15-16.*

(Continued)

*Primary Examiner* — Scott Baderman
*Assistant Examiner* — Asher Kells
(74) *Attorney, Agent, or Firm* — Banner & Witcoff, Ltd.; Michael A. Springs (57) ABSTRACT

Apparatuses and methods are illustrated that relate to a web application running on a server accessible from the Internet. Aspects of the disclosure relate to an apparatus for outputting presentation code in response to receiving at least a page identifier. The apparatus comprises an electronic processor, a tangible medium storing a mapping table, template file, presentation and business rules, and computer-executable instructions.

20 Claims, 6 Drawing Sheets

(56) References Cited

U.S. PATENT DOCUMENTS

| | | |
|---|---|---|
| 2007/0208832 A1 | 9/2007 | Traub et al. |
| 2008/0141141 A1 | 6/2008 | Moore et al. |
| 2008/0148283 A1 | 6/2008 | Allen et al. |
| 2008/0172600 A1* | 7/2008 | Bokor .......................... 715/234 |
| 2008/0255962 A1 | 10/2008 | Chang et al. |
| 2009/0094339 A1 | 4/2009 | Allen et al. |
| 2009/0112824 A1* | 4/2009 | Fu et al. ........................ 707/3 |
| 2010/0138316 A1 | 6/2010 | Connors et al. |

OTHER PUBLICATIONS

MassLight, Chapter 4. Introduction to Struts, © Feb. 2001, MassLight, Inc., 20 pages.

Overview of Monitoring and Management, downloaded Feb. 13, 2010, 4 pages.

Oracle® Database Application Developer's Guide—Fundaments 10g Release 2 (10.2), 13 Developing Applications with Database Change Notification, © 1996, 2005, 18 pages.

The Apache Software Foundation, Struts 1—Welcome, © 2000-2008 Apache Software Foundation, 3 pages.

W3C® Cross-Origin Resource Sharing, Editor's Draft Dec. 23, 2009, http://dev.w3.org/2006/waf/access-control/, downloaded Jan. 21, 2010, 26 pages.

Virtual machine, http://en.wikipedia.org/wiki/Virtual_machine, downloaded Dec. 21, 2009, 8 pages.

Java Management Extensions, http://en.wikipedia.org/wiki/Java_Management_Extensions, downloaded Dec. 21, 2009, 3 pages.

Oracle Database, http://en.wikipedia.org/wiki/Oracle_database, downloaded Dec. 21, 2009, 12 pages.

Ajax (programming), http://en.wikipedia.org/wiki/Ajax_(programming), downloaded Jan. 21, 2010, 3 pages.

Ajax framework, http://en.wikipedia.org/wiki/Ajax_framework, downloaded Jan. 21, 2010, 3 pages.

A Java geek, JMX use cases, http://blog.frankel.ch/tech/dev/java/jmx-use-cases, downloaded Dec. 21, 2009, 5 pates.

European Search Report dated Jan. 21, 2011, Application No. 10251484.1-2211, 8 pages.

Reading from ini file and subscribing to Add/Edit/Delete events, Apr. 19, 2009, http://mycomponent.blogspot.com/2009/04/reading-from-ini-file-and-subscribing.html, retrieved on Apr. 1, 2011, 32 pages.

European Search Report dated Nov. 1, 2011, Application No. 10251482.5-2211, 7 pages.

"Store PHP Code in a MySQL Database," Angela Bradley, http://web.archive.org/web/20080401082803/http://php.about.com/od/phpwithmysql/qt/php_in_mysql.htm, dated Apr. 1, 2008, 1 page.

"PHP Login script Tutorial," http://web/archive.org/web/20070915191038/http://www.phpeasystep.com/phptu/6.htm, dated Sep. 15, 2007.

Chinese Patent Application No. 201010535086.X First Office Action dated Jun. 9, 2014 including translation.

* cited by examiner

Credit Cards

Home  Locations  Contact Us  Help  Sign In

Search

Credit Card Overview
Credit Card Finder
Popular Credit Cards
View All Credit Cards
Build Your Credit
Cash Back
▲ Rewards
  Student
▲ Sports
  Specialty Credit Cards
Tarjetas de Credito
Check Application Status
Access Accounts
Security Features
FAQS

1.25% cash back. Every Purchase. Every Time.
- Earn cash rewards of 1.25% for every $1 in retail transactions
- No annual fee and no limit to how much cash back you can earn
- Redeem easily via statement credit, check or direct deposit Learn More

Find the Right Credit Card for You

Credit card finder
Select your credit card features for customized results
Go
Choose from more than 400 Credit Cards
Popular Credit Cards ▼ Go You may be preapproved for one of our credit cards
Check for Offers Features Cards  ⟪Previous  1 of 4  Next⟫

Earn Rewards faster than ever
- Earn 1.25% points for every $1 in retail purchases
- 0% Introductory APR for Balance Transfers, Check Cash Advances and direct deposits through your first 12 billing cycles.

Apply now

Access My Accounts
Sign in
Credit Card Online Banking
Test Drive
Lost or Stolen Credit Card?

Online Features
Balance Transfers
Consolidate bills and save
Request a balance transfer

Privacy Assist Premier™
Help protect your identity
No cost preview for 30 days
Learn more Page (500)
Content (502A)
Presentation (504A)
Rules (506)
Content (502B)
Presentation (504B)
Presentation (504C)
Content (502C)

FIG. 5

OUTPUTTING PRESENTATION CODE UPDATED FOR A PARTICULAR USER IN RESPONSE TO RECEIVING A PAGE IDENTIFIER

This application claim priority from U.S. provisional application Ser. No. 61/236,135, filed Aug. 23, 2009, the contents of which are herein incorporated by reference in their entirety.

RELATED APPLICATION

This application is related to U.S. application Ser. No. 12/771,807, entitled "Dynamic Configuration System".

This application is related to U.S. application Ser. No. 12/771,238, entitled "Widget Framework".

TECHNICAL FIELD

Aspects of the disclosure relate to a web application running on a server. More specifically, aspects of the disclosure relate to submission of data to render presentation code of a web application.

BACKGROUND

Java Management Extensions (JMX) is a known library extension to JAVA programming language. JMX has been described as "a Java technology that supplies tools for managing and monitoring applications, system objects, devices (e.g. printers) and service oriented networks. Those resources are represented by objects called managed beans. In the API, classes can be dynamically loaded and instantiated."

A known blogger blogged in June 2009 about various JMX use cases, including using JMX to manage an application's configuration, explaining that "even though each application has different needs regarding configuration (one needing a initial thread number attribute, the other an URL), every application needs to be more or less parameterized. In order to do this, countless generations of Java developers . . . have created two components: [1] the first one is a property file where one puts the name value pairs, [2] the other one is a Java class whose responsibilities are to load the properties in itself and to provide access to the values . . . . This is good and fine for initialization, but what about runtime changes of those parameters? This is where JMX comes in. With JMX, you can now expose those parameters with read/write authorizations. JDK 6 provides you with the JConsole application, which can connect on JMX-enabled applications."

Meanwhile, a well-known database vendor provides a feature found in numerous versions of its database software system. The documentation explains that "Database Change Notification is a feature that enables client applications to register queries with the database and receive notifications in response to DML or DDL changes on the objects associated with the queries. The notifications are published by the database when the DML or DDL transaction commits."

AJAX is shorthand for asynchronous javascript and XML. AJAX has been described "a group of interrelated web development techniques used on the client side to create interactive web applications. With AJAX, web applications can retrieve data from the server asynchronously in the background without interfering with the display and behavior of the existing page. The use of AJAX techniques has led to an increase in interactive or dynamic interfaces on web pages . . . . Despite the name, the use of javascript or XML is not actually required, nor do the request need to be asynchronous." Moreover, it has been explained that some drawbacks of AJAX are that "the same origin policy prevents some AJAX techniques from being used across domains, although the W3C has a draft of the XMLHttpRequest object that would enable this functionality."

Numerous content management systems are known in the art. Content management systems are known for storing and, upon request, providing content of various types, including multimedia content. Numerous other software companies are known that provide content management and similar types of software products and/or systems.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment in accordance with aspects of the disclosure, an apparatus for outputting presentation code in response to receiving at least a page identifier. The apparatus comprises an electronic processor, a tangible medium storing a mapping table, template file, presentation and business rules, and computer-executable instructions. The computer-executable instructions are for determining that the mapping table includes the page identifier, retrieving a template file, and generating presentation code using an updated template file. In some embodiments, the apparatus may be such that the application is a dynamic website.

In another embodiment in accordance with aspects of the disclosure, an apparatus is disclosed comprising a computer processor, memory, and/or an interface. In an alternate embodiment the computer memory may be wholly or partially located in a data storage system.

One skilled in the art will appreciate that one or more of the aforementioned methods and features may be embodied as computer-executable instructions stored on a tangible computer-readable medium and executed by a processor.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the disclosure, systems and methods are illustrated involving web applications running on a server accessible from a network (e.g., Internet). The server (or plurality of servers) may accept data and/or commands to render a presentation layer of a web application in a platform- (or environment-) independent manner. Aspects of the disclosure relate to a rendering system that permits submission of data and commands to render a presentation layer of an application. The rendering system generates presentation code using a model-view-controller (MVC) design approach. At an abstract level, the rendering engine system comprises five primary components: core rendering component, pre-fetch component, cache refresh component, widget framework, and ad management framework. The widget framework is the focus of a related application previously identified.

Figure 1:
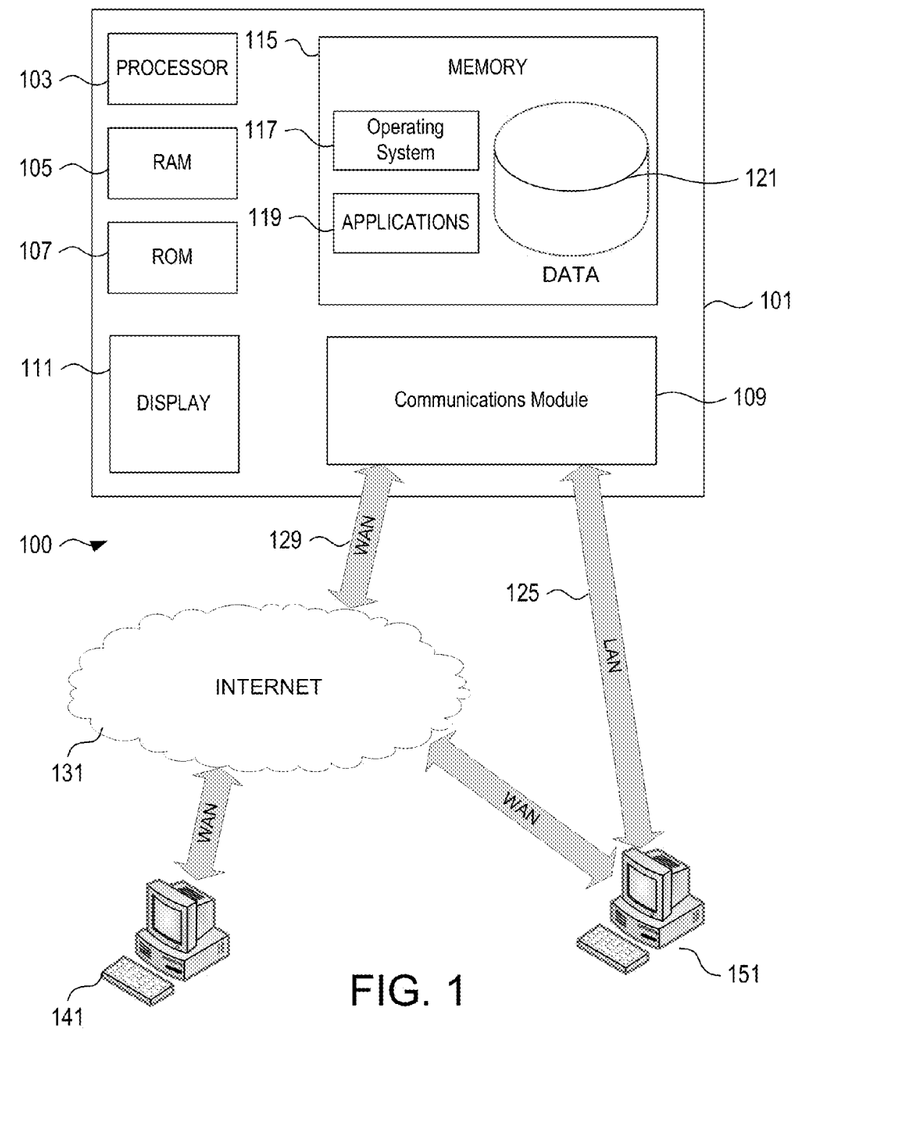
FIG. 1 illustrates a schematic diagram of a general-purpose digital computing environment in which various aspects of the disclosure may be implemented.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of components illustrated in the computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer executable instructions, such as program modules, being executed by a computer. Generally, program modules include routines, programs, objects, components, data structures, and the like that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computing device 101 having a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101. Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device 111 for providing textual, audio-visual and/or graphical output. Software may be stored within memory 115 and/or storage to provide instructions to processor 103 for enabling computing device 101 to perform various functions. For example, memory 115 may store software used by the computing device 101, such as an operating system 117, application programs 119, and a data store 121. Alternatively, some or all of the computer executable instructions for computing device 101 may be embodied in hardware or firmware (not shown). As described in detail below, the data store 121 (e.g., a secure database) may provide centralized storage of account information and account holder information for the entire business, allowing interoperability between different elements of the business residing at different physical locations. In some embodiments, the data store 121 may be physically located external to memory 115. For example, the data store 121 may be an enterprise database located at computing device 151.

Computing device 101 may operate in a networked environment supporting connections to one or more remote computing devices, such as computing devices 141 and 151. The computing devices 141 and 151 may be personal computing devices or web/application servers that include many or all of the elements described above relative to the computing device 101. The network connections depicted in FIG. 1 include a local area network (LAN) 125 and a wide area network (WAN) 129, but may also include other networks. Although shown as a single network in FIG. 1 for simplicity, the network may include multiple networks that are interlinked so as to provide internetworked communications. Such networks may include one or more private or public packet-switched networks, e.g. the Internet, one or more private or public circuit-switched networks, e.g. a public switched telephone network, a cellular network configured to facilitate communications to and from mobile communication devices, e.g. through use of base stations, mobile switching centers, and the like, a short or medium range wireless communication connection, e.g. ultra wideband (UWB), infrared, WiBree, wireless local area network (WLAN) according to one or more versions of Institute of Electrical and Electronics Engineers (IEEE) standard no. 802.11), or a high-speed wireless data network such as Evolution-Data Optimized (EV-DO) networks, Universal Mobile Telecommunications System (UMTS) networks, Long Term Evolution (LTE) networks or Enhanced Data rates for GSM Evolution (EDGE) networks. Devices 150-170 may use various communication protocols such as Internet Protocol (IP), Transmission Control Protocol (TCP), Simple Mail Transfer Protocol (SMTP) among others known in the art. Various messaging services such as Short Messaging Service (SMS) and/or Multimedia Message Service (MMS) may also be included.

When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computing device 101 according to an illustrative embodiment of the invention may include computer executable instructions for invoking user functionality related to communication, such as email, short message service (SMS), and voice input and speech recognition applications.

Figure 2A:
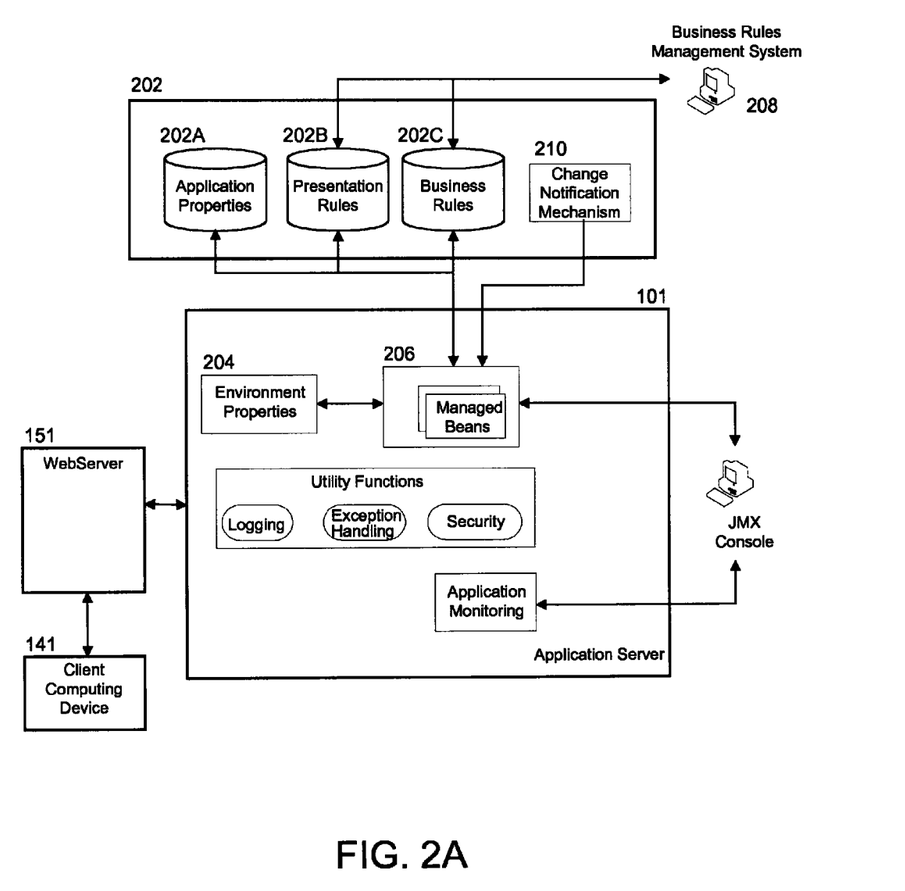
FIG. 2A and FIG. 2B illustrate embodiments of a system in accordance with aspects of the disclosure.

FIG. 2A illustrates one embodiment of a system in accordance with aspects of the disclosure. A client computing device 141 may communicate with a webserver 151 that in turn may communicate with an application server 101. In some embodiments, the webserver 151 and application server 101 may be on different Internet domains. In alternate embodiments, the webserver 151 and application server 141 may the same physical machine. The client computing device 141 may include a display for showing a user the graphical user interface (GUI) of an application. As such the application server may include a display interface configured to send a GUI of an application to the display device. The display interface may construct the GUI corresponding to the application by using a rendering system, which in some embodiments may use business rules (or the modified business rules).

The application server 101 may access data (e.g., application properties, presentation rules, business rules, and the like) stored on a data storage system 202 (e.g., a secure database system). One skilled in the art will appreciate that although various components in FIG. 2A are visually depicted as being located in a particular device, the disclosure contemplates one or more components being located in a different device, a single device, or being omitted. For example, in one embodiment, the data storage system 202 may be located inside the application server 101, or one or more components from data storage system 202 and application server 101 may be located (or colocated) in other blocks of FIG. 2A.

The system of FIG. 2A may include a data storage system 202 configured to hold data for use by one or more applications executing in an application server 101. The data storage system 202 may store data including at least one or more of the following: application properties 202A (e.g., mapping table), presentation rules 202B (e.g., properties files), and/or business rules 202C (e.g., business logic). The terms business rules and business logic are used interchangeably in this disclosure. Likewise, the terms presentation rules and properties files are used interchangeably in this disclosure. The data storage system 202 may include computer memory (e.g., tangible computer-readable medium) for storing the one or more business rules (e.g., a first business rule, a second business rule, and the like) Moreover, the data storage system 202 may store a mapping table, properties files (e.g., presentation rules 202B), business logic (e.g., business rules 202C), and other data such as computer-executable instructions. In addition, a business rules management system 208 (BRMS) may be provided to assist in creating, modifying and/or maintaining the various data stored I the data storage system 202. The BRMS may provide a user-friendly graphical user interface (GUI) to allow business users with little to no computer programming (and webpage authoring) experience to create, modify, and maintain the presentation and configuration of an online application (e.g., a website) running on a virtual machine. In some alternate embodiments in accordance with aspects of the invention, the BRMS may be specialized in business rules generation and management (e.g., using DROOLs) and other systems may be used for managing the presentation and content, and for managing page configuration. (See e.g., system 228 and system 230 in FIG. 6).

The data store 202 (e.g., secure database system) may further include a change notification mechanism 210. The change notification mechanism may provide notifications of modification of data (e.g., application properties 202A, presentation rules 202B, business rules 202C, and the like) The notification may take the form of, for example in one embodiment, an alert over an IRQ (interrupt request) line. In another embodiment, the notification may be software-implemented using the well documented "observer" design pattern where a "subject" and an "observer" are loosely coupled, and the subject provides notification to an observer when the subject changes state. One skilled in the art will appreciate that other configurations or design patterns are known in the art and may be used to provide notifications of modifications (e.g., state changes) of data, such as polling techniques, push techniques, and subject-observer implementations. In addition, the application server 101 may contain an interface to the change notification mechanism 210 so as to enable the receipt of notifications. For example, the application server 101 may include an instantiation of an "observer" configured to obtain notifications of business rule modifications from a "subject" in the data storage system 202.

In accordance with various aspects of the disclosure, an application server 101 might not rely on a virtual machine to execute computer-executable instructions. In other embodiments, the application server 101 may include a virtual machine 206 configured to use a processor (e.g., microprocessor, multi-core processor, special-purpose processor, and the like) to execute computer-executable instructions. These instructions may include bytecode configured to be executed by the virtual machine to cause the system of FIG. 2A to perform one or more steps identified in FIG. 3 (and throughout this disclosure). The virtual machine 206 may include managed beans to assist in managing resources (e.g., environment properties file(s) 204, application properties, and the like) and/or performing one or more of the aforementioned steps. These objects are well-known in the art and may be used in conjunction with JMX (e.g., a JMX console) to assist in monitoring aspects of the one or more applications running on the virtual machine 206.

In accordance with various aspects of the disclosure, the virtual machine 206 may also include a rules control mechanism configured to permit an application running on the virtual machine to access a first set of business rules, while concurrently restricting the application from accessing a second set of business rules. Meanwhile, the rules control mechanism may permit a second application also running on the virtual machine 206 to access the second set of business rules, but restrict that application's access to the first set of business rules. One of skill in the art will recognize that at least one benefit of a system with a virtual machine 206 with the rules control mechanism is the ability to restrict visibility of properties (e.g., business rules, presentation rules, environment properties 204, and the like) at the level of the application. For example, different applications may then have the same names for properties without conflict. Therefore, interchangeability of underlying vendor products and future porting are greatly enhanced and simplified. In one embodiment in accordance with the disclosure, the rules control mechanism may be implemented using managed beans (see Ref. 206 in FIG. 2). In another embodiment in accordance with the disclosure, the rules control mechanism may be implemented through computer executable instructions stored on a tangible computer-readable medium of the application server 101 and executed by the virtual machine 206.

In addition, the system of FIG. 2 may include utility functionality to assist in the dynamic configuration of properties. For example, a logging module may be included to record the login of the user that edits a property value in a properties file and the date/time when the modification occurred (e.g., by populating "modified_by" and "modified_date" fields in a log table). The logged information may provide, inter alia, an audit trail for modifications to business rules, presentation rules, application properties, environment properties, and the like. In another embodiment, the logging module may provide the ability to designate the level of detail to record in application logs. For example, a logging level of "5" may indicate that all error messages and warning messages generated by the application should be recorded in a log file. (See FIG. 4, ref. 408). In addition, modules for other utility functions (e.g., exception handling module and security module in FIG. 2A) may be provided to assist application developers and testers in handling exceptions and security. For example, a security module may provide information about what application developers and/or business users may modify which properties. At least one benefit of a security module is that it may prevent lay business users from accessing and mistakenly modifying a property value that could cause the entire system to crash (e.g., generate a fatal error message or other undesirable behavior.)

Figure 2B:
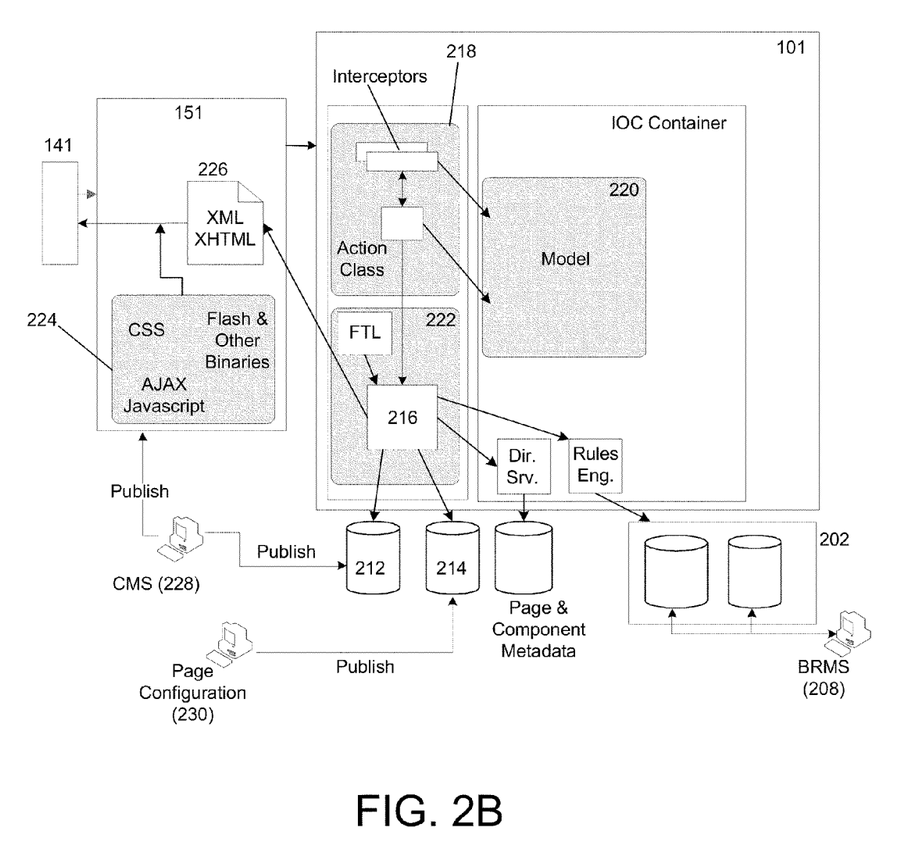
Figure 3:
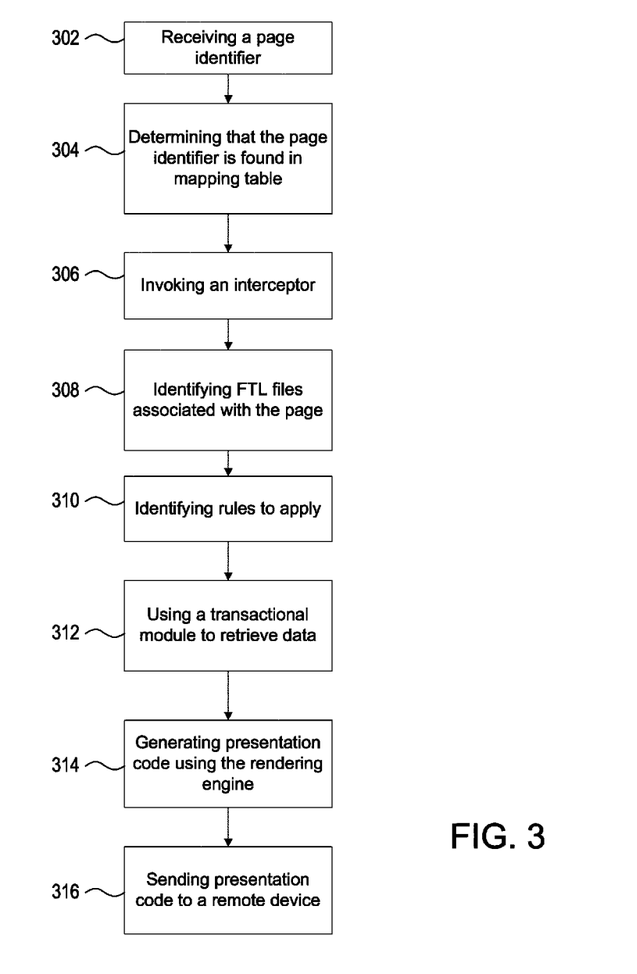
FIG. 3 is a flowchart illustrating one embodiment of a method in accordance with aspects of the disclosure.

FIG. 3 is a flowchart illustrating one embodiment of a method in accordance with aspects of the disclosure. One or more aspects of the method may be implemented using a system (e.g., the system illustrated in FIG. 2B). A client computing device 141 may submit a request to a webserver 151. In one example, the client computing device 141 may be executing a web browser that submits a hypertext transfer protocol (HTTP) request to the webserver 151. The HTTP request may originate from a button press (e.g., the submit button) on a particular page (e.g., "page1.html"). In a different embodiment, the client computing device 141 may have a standalone software application installed on it, and that application may request server 151 to provide information for rendering on the device's screen.

In step 302, the server 151 may receive at least a page identifier from a client computing device 141. The page identifier may be as simple as a string word/phrase or an integer/hexadecimal value. The page identifier may be passed to the application server 101 for processing, or it may be processed in the web server 151. Processing includes determining, using a processor 103, that the page identifier is found in the mapping table. (See step 304). The mapping table may be stored on a tangible computer-readable medium 115 of server 101. The mapping table includes a plurality of page identifiers and their corresponding web pages (or application states).

For example, once a match is found for the page identifier in the mapping table, the system may invoke an interceptor in step 306. An interceptor may be invoked prior to execution of an action, and may be responsible for, among other things, for creation of an user interface context and initialization of controllers for freemarker templates (FTL). Interceptors are further described in detail in U.S. provisional application Ser. No. 61/236,135, which was previously incorporated by reference in its entirety. One skilled in the art will appreciate that interceptors are a recognized programming construct in computer programming. The interceptors may conceptually reside in the controller 218 part of the well-documented model-view-controller pattern, as illustrated in FIG. 2B. The interceptors assist in various controller-type responsibilities of the system, including interacting with model-type components (conceptually residing in model 220) and view-type components (conceptually residing in view 222).

In step 308, as part of the responsibilities of the view 222 part of the model-view-controller pattern, freemarker template (FTL) files associated with the page identifier received in step 302 may be identified. The FTL files may be indirectly associated with the page identifier from step 302 because the FTL files may be associated with the page (or application state) mapped to the page identifier. FTL files are further described in detail in U.S. provisional application Ser. No. 61/236,135, which was previously incorporated by reference in its entirety.

In step 310, rules (e.g., business rules and/or presentation rules) may be identified. The identification may be based on, among other things, the page identifier from step 302 (and/or the page or application state mapped to the page identifier. In some examples, the rules may be further identified by other characteristics, besides page or page identifier.

In step 312, a transactional module may retrieve content data from at least one data storage system 212 based on an updated template file. Multiple data storage systems 212 may contribute to the content data being arranged according to the updated template file. For example, in a large organization with multiple partners and/or subsidiaries, the organization may require content data to be extracted from multiple sources and seamlessly integrated into a single presentation output. Along these lines, the transactional module may extract data from multiple sources and integrate the content in accordance with the appropriate template (e.g., the updated template file initially identified in step 308). Templates consist of defined zones/wells (e.g. header, footer, masthead, ad space, transaction area) that are populated with static or dynamic content at page assembly time, and localization ability presents a user experience tailored to a Customer's locale (country, language), where localized aspects of the experience can include language, layout, navigation, content, field symbols and formats.

In an alternate embodiment, the transactional module may obtain a reference to an XML document and parse the XML document to extract desired content data. The transactional module may retrieve multiple XML documents from a plurality of sources. For example, the transaction module may retrieve an XML document from JointVenture1 (i.e., a joint venture partner), Subsidiary1 (i.e., a subsidiary company), and from the company's own XML data store. The XML documents from each of these sources may be obtained, parsed, and the extracted content may be used to populate the template (i.e., the updated template describe above). The content retrieved from XML documents (or from a data storage system 212) need not be limited to textual data. The disclosure contemplates data of various types, including, but not limited to picture graphics, animated graphics, video, and the like.

In step 314, presentation code may be generated from the rendering engine 216. The rendering engine 216 may output the presentation code in one or more types of formatted output. For example, the presentation code may be formatted in hypertext markup language (HTML), extensible markup language (XML), WML, and the like. This outputted presentation code may be sent (in step 316) to a remote device. For example, the remote device may be the client computing device 141 discussed in step 302. In an alternate embodiment, the remote device may be a different device, such as web-server 121 or another computing device.

Figure 4:
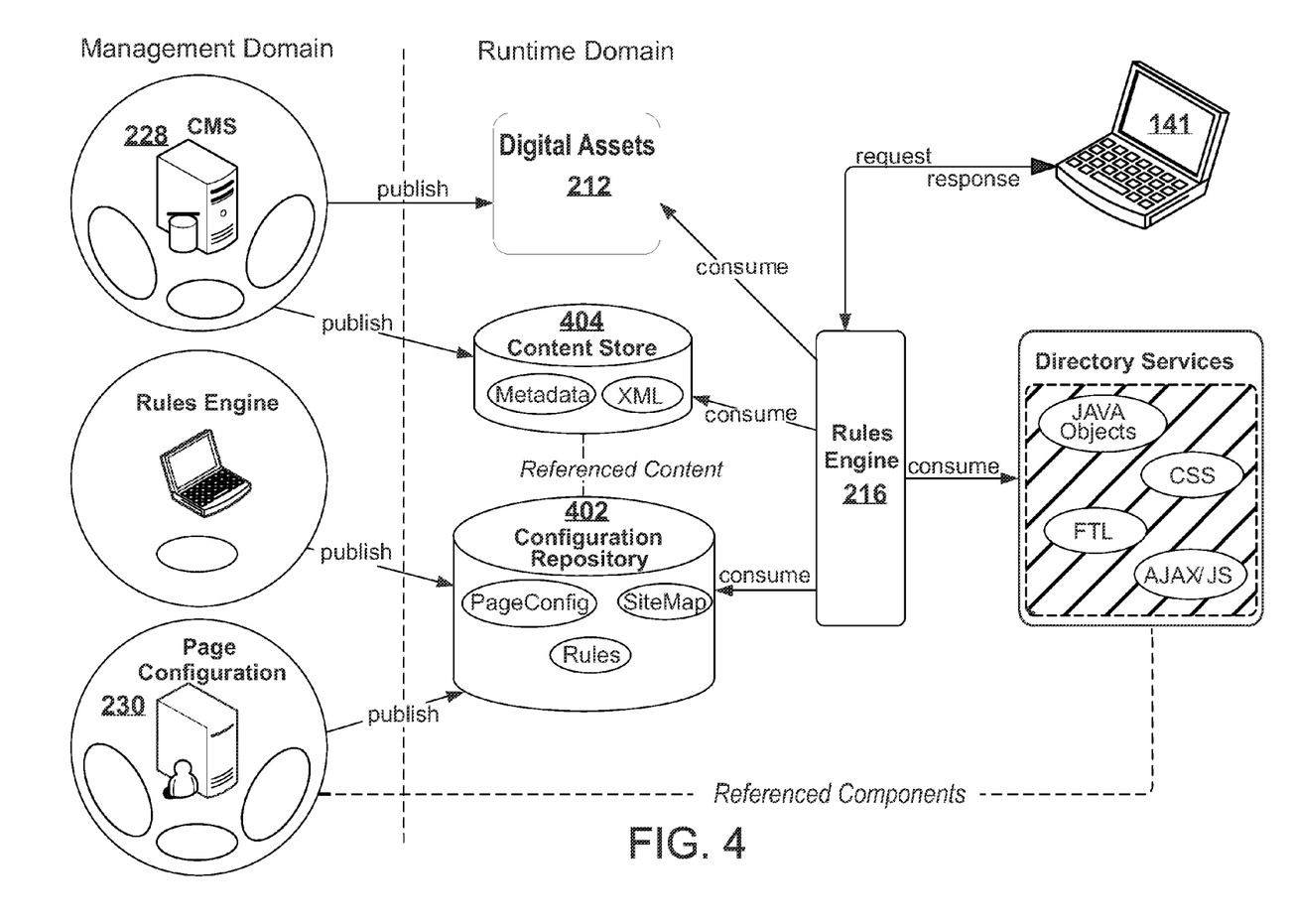
FIG. 4 illustrates an embodiment of a system highlighting a management domain and a runtime domain of the system in accordance with aspects of the disclosure.

Referring to FIG. 4, the diagram illustrates an embodiment of a system highlighting a management domain and a runtime domain of the system in accordance with aspects of the disclosure. In the management domain, the content management system 228, rules engine, and page configuration system 230 comprise mechanisms/modules that assist in the creation and maintenance of rules, content, templates, and/or workflows. Meanwhile, the runtime domain encompasses those mechanisms/modules that assist in the run-time implementation of the aforementioned rules and workflows and/or rendering of the aforementioned content and templates. For example, content management system 228 may publish digital assets (e.g., video files, RSS feeds, URL links, and the like) and store data in a content store 404. The data in the content store 404 may include, but is not limited to, XML and associated metadata. In addition, the rules engine and page configuration system 230 may publish to a configuration repository 402. The configuration repository may include, but is not limited to, page configuration information, configuration rules, and workflow (e.g., sitemap.xml mapping file). Referring to FIG. 2B, the page configuration system 230 may store page configuration information in a data store 214. The data store 214 may include workflow information, such as the transition mapping from one page to another page illustrated in exemplary sitemap.xml, which is described in detail in U.S. provisional application Ser. No. 61/236,135, which was previously incorporated by reference in its entirety. For example, the workflow information may include a mapping showing that if a particular button (or link) is selected on a page, then the system may transition to another particular page. One skilled in the art after review of the entirety disclosed herein will appreciate that such a workflow is similar to that of state diagrams well known in the art.

A rendering engine 216 may consume one or more of the resources provided by these runtime domain components to respond to a request from an exemplary client computing device 141.

Figure 5:
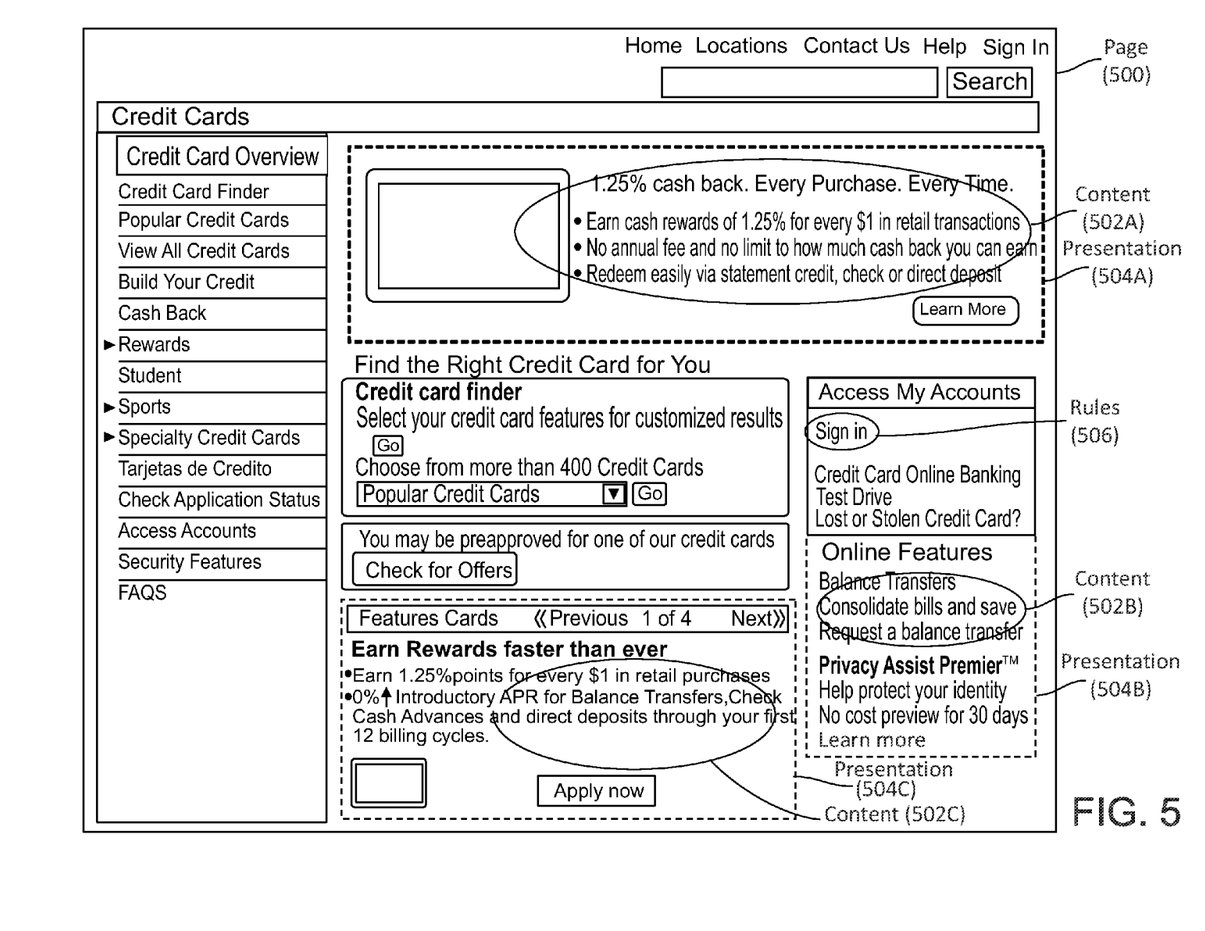
FIG. 5 is an illustration of an exemplary webpage showcasing various aspects of the disclosure.

Referring to FIG. 5, an application server 101 may generate a web page 500 with content (see 502A, 502B, 502C, which collectively are 502) formatted in a presentation (504A, 504B, 504C, which collectively are 504) and applying rules 506. The content 502 may be retrieved from a content data store 212 managed by a content management system 228. The presentation 504 may be presented based on one or more freemarker templates (FTL) of application server 101. In addition, client-side user interface (UI) components 224 (e.g., cascading style sheets, asynchronous Javascript, Javascript, and Flash) may assist in rendering the presentation 504. The presentation code generated may result in a web page 226 that is sent to a client computing device 141. One skilled in the art will appreciate that web page 226 may be in formats other than hypertext markup language (HTML) and may be in XHTML, XML, WML, or other formats.

Although not required, one of ordinary skill in the art will appreciate that various aspects described herein may be embodied as a method (where the method may include executing business and presentation rules associated with the page identifier to update the template file for a particular user, updating the template file by applying presentation rules associated with page identifier, executing business rules associated with the page identifier to adjust the template file for a particular user group, and/or updating the template file by applying presentation rules associated with the page, where updating of the template file by applying the presentation rules may include setting the background color and foreground color (e.g. the background color is white for a first user, and pink for a second user), and where the business rules may be based on attributes of the particular user and/or involve data about the particular user), a data processing system, or as a computer-readable medium storing computer-executable instructions. Aspects of the invention have been described in terms of illustrative embodiments thereof. Numerous other embodiments, modifications and variations within the scope and spirit of the appended claims will occur to persons of ordinary skill in the art from a review of this disclosure. For example, the disclosure contemplates an application server 101 that executes compiled computer-readable instructions and does not rely on a virtual machine 206. In other words, various embodiments of the claimed invention may operate without necessitating a virtual machine 206. In another example, one of ordinary skill in the art will appreciate that the steps illustrated in the illustrative figures may be performed in other than the recited order, and that one or more steps illustrated may be optional in accordance with aspects of the disclosure. In addition, the steps described herein may be performed using a processor,

We claim:

1. An electronic apparatus for outputting presentation code in response to receiving at least a page identifier of an application code comprises content retrieved from at least one data storage system and formatted by a rendering engine, the apparatus comprising:
  an electronic processor;
  a tangible computer-readable medium storing:
    a mapping table comprising a plurality of page identifiers associated with the application;
    a template file associated with the page identifier;
    presentation rules associated with the page identifier; and
    business rules associated with the page identifier; and
  the tangible computer-readable medium further storing computer-executable instructions that when executed by the processor cause the apparatus to perform steps comprising:
    determining that the mapping table includes the page identifier;
    invoking an interceptor associated with the page identifier;
    retrieving a template file associated with the page identifier;
    applying the presentation rules associated with the page identifier to update the template file for a particular user;
    executing business rules associated with the page identifier to update the template file for a particular user;
    retrieving content from at least one data storage system based on the updated template file and the business and presentation rules;

generating presentation code using the updated template file and the retrieved content, where the presentation code is in a desired format; and sending the generated presentation code.

2. The apparatus of claim 1, where the format of the generated presentation code is hypertext markup language.

3. The apparatus of claim 1, where the application is a dynamic website comprising dynamic HTML.

4. The apparatus of claim 1, where the at least one data storage system comprises two different data storage systems, and content from each data storage system is included in the presentation code, and wherein the at least one data storage system comprises a business rules management system for generating and modifying the business rules.

5. The apparatus of claim 4, where the retrieving of content from two different data storage systems is performed by a transactional module residing on the tangible computer-readable medium.

6. The apparatus of claim 1, where the business rules involve data about the particular user, and the data storage system accessed when executing the business rules comprises a secure database.

7. The apparatus of claim 1, where the template file is a FTL file.

8. The apparatus of claim 1, where the mapping table is formatted in extensible markup language.

9. The apparatus of claim 1, further comprising:
a first set of logic and properties comprising a first type of business logic and a first type of properties file;
at least a second set of logic and properties comprising a second type of business logic and a second type of properties file;
a rules control mechanism configured to, based on the page identifier, permit access to one set of logic and properties, while concurrently restricting access to all other sets of logic and properties; and
a communications module configured to send at least the generated presentation code to an electronic device located remotely.

10. A method comprising:
storing a mapping table on a tangible computer-readable medium;
storing a plurality of template files on the tangible computer-readable medium;
storing a plurality of presentation rules on the tangible computer-readable medium;
storing a plurality of business rules on the tangible computer-readable medium;
receiving a page identifier;
determining, using a processor, that the page identifier is found in the mapping table, where the mapping table stores a plurality of page identifiers;
retrieving a template file associated with the page identifier from the tangible computer-readable medium;
updating, using the processor, the template file for a particular user by applying presentation rules associated with page identifier;
executing, using the processor, business rules associated with the page identifier to adjust the template file for a particular user;
retrieving content, using a transactional module, from at least one data storage system based on the updated template file and the presentation rules and business rules;
generating presentation code, using the processor, based on the updated template file and retrieved content, where the presentation code is in a desired format; and
sending the generated presentation code to an electronic device located remotely.

11. The method of claim 10, where the at least one data storage system comprises two different data storage systems, and content from each data storage system is included in the presentation code, and where the method further comprises parsing at least one document to retrieve the desired content data.

12. The method of claim 11, where the business rules are based on attributes of the particular user's account information, and the data storage system accessed when executing the business rules comprises a secure database.

13. The method of claim 10, where the mapping table is formatted in extensible markup language.

14. The method of claim 10, where the updating of the template file by applying the presentation rules includes setting a background color and a foreground color.

15. The method of claim 14, where the background color is white for a first user, and pink for a second user.

16. The method of claim 10, where the presentation code is formatted in hypertext markup language.

17. A non-transitory computer-readable medium comprising computer-executable instructions that cause an apparatus to perform steps comprising:
invoking an interceptor associated with a page;
retrieving a template file associated with the page;
updating the template file for a particular user by applying presentation rules associated with the page;
executing business rules associated with the page to update the template file for a particular user;
retrieving content from at least one data storage system by applying the business rules to the updated template file;
generating presentation code by applying the presentation rules to the updated template file and the retrieved content, where the presentation code is in a desired format; and
sending the generated presentation code.

18. The non-transitory computer-readable medium of claim 17, where the at least one data storage system comprises two different data storage systems, and content from each data storage system is included in the presentation code.

19. The non-transitory computer-readable medium of claim 17, where the generated presentation code is formatted in hypertext markup language.

20. The non-transitory computer-readable medium of claim 17, where the template file is a FTL file.

* * * * *